US011468038B1

(12) United States Patent
Assenmacher

(10) Patent No.: US 11,468,038 B1
(45) Date of Patent: Oct. 11, 2022

(54) SYSTEM AND METHOD FOR INTERFACING A DATABASE SYSTEM WITH A CONSENSUS SYSTEM

(71) Applicant: Cryptowerk Corp., Redwood City, CA (US)

(72) Inventor: Holger Assenmacher, Eulenbis (DE)

(73) Assignee: CRYPTOWERK CORP., Redwood City, CA (US)

( * ) Notice: Subject to any disclaimer, the term of this patent is extended or adjusted under 35 U.S.C. 154(b) by 244 days.

(21) Appl. No.: 16/533,442

(22) Filed: Aug. 6, 2019

Related U.S. Application Data

(60) Provisional application No. 62/715,066, filed on Aug. 6, 2018.

(51) Int. Cl.
*G06F 16/23* (2019.01)
*G06F 21/60* (2013.01)

(52) U.S. Cl.
CPC ........ *G06F 16/2365* (2019.01); *G06F 21/602* (2013.01)

(58) Field of Classification Search
None
See application file for complete search history.

(56) References Cited

U.S. PATENT DOCUMENTS

| | | | |
|---|---|---|---|
| 9,898,618 B1* | 2/2018 | Roth | G06F 16/2452 |
| 2013/0173539 A1* | 7/2013 | Gilder | G06F 16/27 |
| | | | 707/622 |
| 2015/0095286 A1* | 4/2015 | Spyker | G06F 16/2379 |
| | | | 707/648 |
| 2016/0253523 A1* | 9/2016 | Kroonmaa | G06F 21/64 |
| | | | 726/26 |
| 2019/0238316 A1* | 8/2019 | Padmanabhan | H04L 9/3297 |
| 2019/0268139 A1* | 8/2019 | Kurian | H04L 9/3239 |
| 2020/0272618 A1* | 8/2020 | Hughes | G06F 16/2365 |

FOREIGN PATENT DOCUMENTS

WO 2018/026727 A1 2/2018 ............. G06Q 30/00

* cited by examiner

*Primary Examiner* — Eddy Cheung
(74) *Attorney, Agent, or Firm* — Slayden Grubert Beard PLLC

(57) ABSTRACT

A method and a system for interfacing a database system with a consensus system are provided. The method comprises at least the steps of creating a shadow table of a table of the database system; and for each row of the shadow table: serialization of data, stored in a current row of the shadow table; generating a data item verification fingerprint of the data; and providing the data item verification fingerprint to the consensus system.

12 Claims, 3 Drawing Sheets

SYSTEM AND METHOD FOR INTERFACING A DATABASE SYSTEM WITH A CONSENSUS SYSTEM

CROSS-REFERENCE TO RELATED APPLICATIONS

This application claims priority to U.S. Provisional Patent Application No. 62/715,066, filed on Aug. 6, 2018 with the United States Patent and Trademark Office. The contents of the aforesaid Provisional Patent Application are incorporated herein for all purposes.

FIELD OF THE INVENTION

The invention relates to achieving consensus for data in databases and increasing trust and security in those.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Past systems use information processing methods like persistent storage or code execution that are included in the blockchain itself, thus inheriting its limitations.

Consensus systems or algorithms, among them blockchains, provide desirable properties, for instance consensus on something having happened in the past, on the existence of digital assets, on their immutability, on the non-repudiation of past actions.

If traditional services of information technology like storing of persistent data or execution of code are to be augmented with, say, blockchain properties, the current state of the art is to build a blockchain system that provides those. Storing of data is done in the blockchain itself (for example the contents of monetary transactions) or the execution of code (for example smart contracts).

Until now, the assertion of consensus properties is achieved by integrating data processing, storage, and querying into the system providing the consensus itself, such as the blockchain. For instance, a blockchain not only achieves consensus but stores the transaction data or holds the code for smart contracts.

SUMMARY

As the inventor of the instant application has ascertained, this approach imposes the limitations of the consensus system (like low throughput for a public and trusted blockchain of about 10 per second or higher throughput at the cost of decreased trust by reducing the number of nodes achieving consensus) on the traditional system like a database.

In this disclosure, a system and a method is proposed for enhancing a traditional database system with the desirable properties of a consensus system, such as for example one that uses blockchain-based consensus.

By that, the trustworthiness of data or executed code can be improved. For example, it can be proven to any third party that an item in a database in the cloud is actually the one that was originally put there at a certain date or that the execution of a particular piece of code actually happened at a certain time using defined input data and resulting in defined output data.

In one aspect, a method for interfacing a database system with a consensus system comprises the steps of creating a shadow table of a table of the database system and for each row of the shadow table: serializing of data, stored in a current row of the shadow table; generating a data item verification fingerprint of the data; and providing the data item verification fingerprint to a consensus system.

The details of one or more embodiments are set forth in the accompanying drawings and the description below. Other features will be apparent from the description, drawings, and from the claims.

DETAILED DESCRIPTION OF THE INVENTION

Specific embodiments of the invention are described in detail below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following explanation of the present invention according to the embodiments described, the terms "connected to" or "connected with" are used to indicate a data connection between at least two components, devices, units, processors, or modules. Such a connection may be direct between the respective components, devices, units, processors, or modules; or indirect, i.e., over intermediate components, devices, units, processors, or modules. The connection may be permanent or temporary; wireless or conductor based.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named elements. For example, a first element is distinct from a second element, and the first element may encompass more than one element and succeed (or precede) the second element in an ordering of elements.

In some embodiments, the present invention connects consensus achieved for instance by a blockchain or similar consensus algorithms with the data and code this consensus is to be applied on. In some embodiments, data and code can be built in the way the current state of the art permits, in particular without the limitations of throughput or quality of a consensus algorithm, but still link it with the properties provided by the consensus mechanism. The resulting "orthogonal setup" provides a significantly easier and robust system architecture. It permits combining the benefits of a consensus system with already existing database and/or code execution systems, that themselves took decades of development.

In the context of the present explanation, a consensus algorithm is understood, without limitation, as a public or private blockchain, Hedera Hashgraph, Iota, any database synchronization algorithm, like PBFT, queue synchronization like Kafka, or any public notary system.

Figure 1:
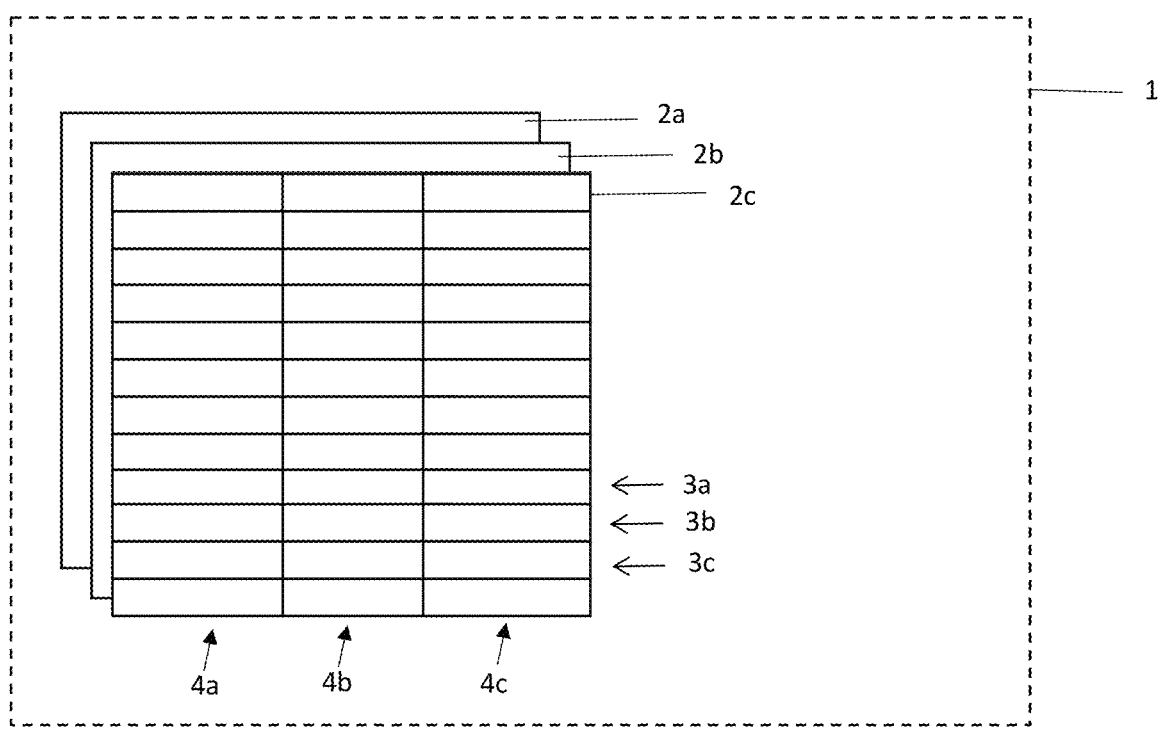
FIG. 1 shows an schematic block diagram of an embodiment of a database system.

FIG. 1 shows an embodiment of a database system 1. The database system 1 in the present example is an SQL database system with various tables 2a-2c. In other embodiments, the database system 1 may correspond to a noSQL database, an Amazon S3 data storage, Cognito, Lambda as a basis for smart contract systems, PostgreSQL, SAP Hana, other relational databases, etc. The invention is also usable for other "ordered data arrangements" such as filesystems (where the tables 2a-2c correspond to files), spreadsheets, cloud data storages, an API for storing and retrieving data, etc., and/or code execution systems. All of the aforementioned examples, are also understood as "database systems" herein, without limitation.

A code execution system is any system that can execute code, like a local computer or a server or a serverless computing platform, so that the system that can execute verifiable smart contracts, for example, by creating smart stamps as verifiable chain of hashes anchored in one or more consensus systems of (a) the executed code in source or binary form, (b) its input and pre-state, and (c) its output and post-state.

The database system 1 according to the present embodiment may be used to store general business data. In other embodiments, the database system 1 may be used in an authentication system, e.g., to store user account information, or a cloud computing system to store data and/or executable code, without limitation. As will be apparent from the following, the functionality of the discussed connector system may be applied to the above-mentioned database independent of what type or content the actual data consists of. As such it may also be applied to code execution by achieving consensus on the code to be executed, in binary or source code form, the machine state before and after execution.

Reverting back to FIG. 1, each table 2a-2c comprises a plurality of nouns 3a-3c, also referred to as datasets or rows, and data fields 4a-4c, i.e. columns. Each of the nouns 3a-3c comprises a primary key to identify the respective noun. Other arrangements are of course possible and encompassed.

In the following, it is assumed that the data in table 2c is to be made verifiable using a consensus system, i.e., that the nouns 3a-3c are to be recorded in the blockchain 22 so that tampering can be determined, i.e., allowing a verification of data integrity of database table 2c. In the present embodiment, the consensus system is a public blockchain, such as the Bitcoin or Ethereum blockchain.

Figure 2:
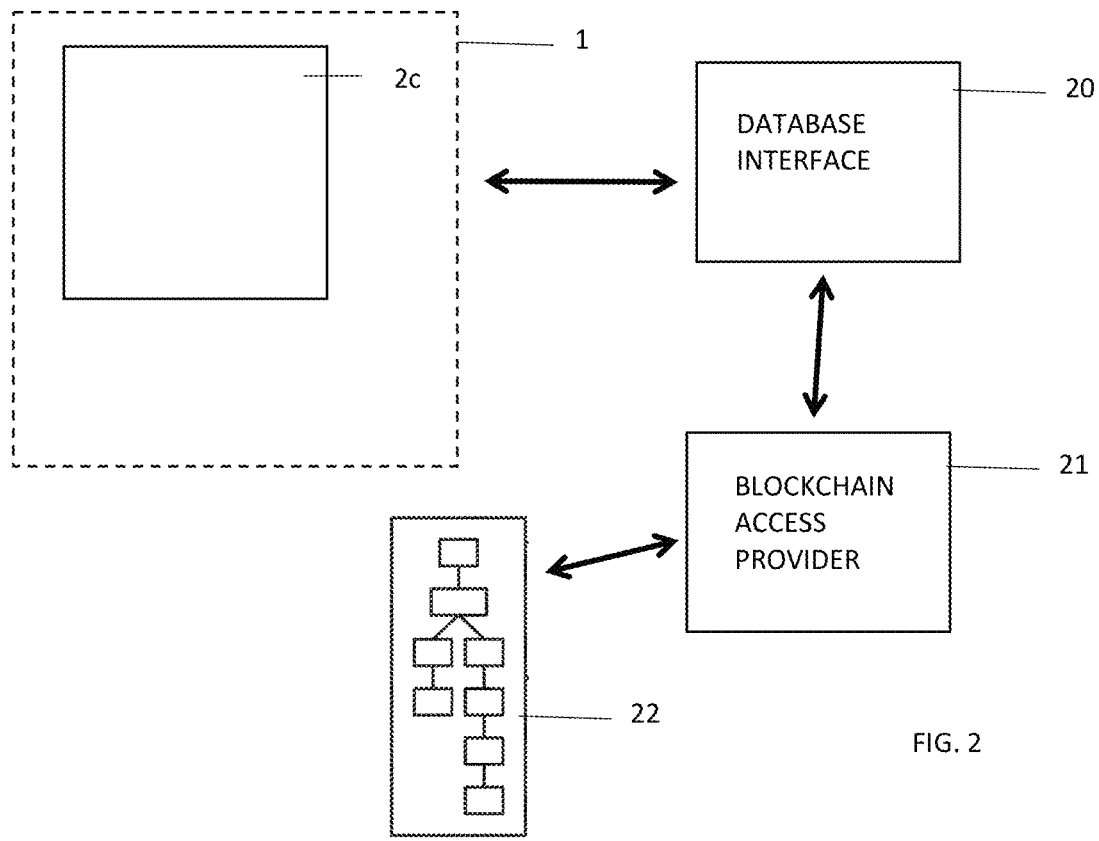
FIG. 2 shows an schematic block diagram of an embodiment of a database interface together with the database system of FIG. 1.

FIG. 2 shows an embodiment of a database interface 20 that interfaces with database system 1 as well as a blockchain access provider's system 21 for accessing the Bitcoin blockchain 22. It is noted that the database system 1 is shown in FIG. 2 with reduced detail only, so as to not obscure the present explanation. The database interface 20 is a computing system comprising a memory (not shown) with programming to conduct the operation, discussed in the following with reference to the flow diagram of FIGS. 3A and 3B. Database interface 20 has read/write access to database system 1 and is connected with the blockchain access provider's system 21 to at least have an aggregated verification fingerprint stored in the blockchain 22 and to access the blockchain 22 subsequently to determine data integrity.

The operation of database interface 20 is explained in the following with reference to the flow diagram of FIG. 3A. The operation starts in step 30 with the selection of a table to be processed. As discussed in the preceding, table 2c of database system 1 is to be recorded in blockchain 22, so that an identifier for table 2c is provided to the database interface 20. In step 31, database interface 20 creates a shadow table of table 2c in database system 1, i.e., an exact copy of table 2c. The shadow table is created with the same primary keys for the nouns as in original table 2c, so that it is possible to compare nouns, i.e., datasets, between table 2c and its shadow table.

In step 32, a verification data field, in other words a column, is added to the shadow table. The verification data field serves to store 'smart stamps' that result from the recording in the blockchain, as discussed in the following.

The shadow table allows the following operation to be conducted without locking the database 2c for an extended period of time.

In step 33, the data of the first row of the shadow table is serialized, i.e., into a binary string. In step 34, a data item verification fingerprint, such as a hash, is generated from the serialized first row. The generated associated data item verification fingerprint is provided to a consensus recording subroutine, also referred to as "consensus system" herein, in step 35. The consensus recording subroutine in essence collects data item verification fingerprints until a predefined number of them are received. Then, a hash tree is formed of the number of data item verification fingerprints, i.e., an aggregated verification fingerprint. The root hash of the hash tree (Merkle tree) is transmitted to the blockchain access provider's system 21 and subsequently recorded in blockchain 22. The details of the operation of the subroutine and the generation of data item verification fingerprints are disclosed in WO 2018/026727 A1 of the present inventor, incorporated by reference herein. It is noted, that the generation of the aggregated verification fingerprint is not limited to the use of a hash tree. For example, the aggregated verification fingerprint may be generated by serializing the data item verification fingerprints, without limitation.

In step 36, the routine of database interface 20 waits to receive a smart stamp for the current data item verification fingerprint. The smart stamp allows a later verification of the integrity of the associated row. Details of this process can be found in WO 2018/026727 A1. Once the smart stamp is received in step 37, it is stored in the verification data field of the respective row of the shadow table. A smart stamp represents the mathematical proof that links a data item to the consensus mechanism, thus effectively extending the consensus properties to the data item. A smart stamp is a bundle of one or more hashes, such as a chain of hashes, needed to retrospectively verify a certain data item verification fingerprint and thus respective database row. The smart stamps thus are electronic "seals" of the respective service data items.

In parallel to steps 36 and 37, a new (parallel) instance of the operation is started in step 38. This is to expedite the procedure until each smart stamp is returned. In step 39, it is checked whether a further row is available in the shadow table or whether the end of the shadow table has already been reached. For example, a pointer may be used for this purpose as known in the art. If another row is available, the row is selected and then is serialized in step 42. The operation then reverts to step 34 and a data item verification fingerprint is generated for this row. If the end of the table has been reached, the processing of the current run is completed in step 40, as the entire table has been processed.

After the first run, database operations may have occurred in the meantime, so that it may be necessary to synchronize the shadow table. The corresponding operation is shown in the flow diagram of FIG. 3B.

Note that the data itself and its formatting remains unchanged. I.e., there is no need to change or migrate the existing application(s) using that data. The added shadow table(s) typically remain transparent to the existing application and will only be used for automatic verification or arbitration. Consider, for example, the existing information processing systems run by a bank. Just by duplicating those systems into a second instance and applying the presented method, this bank can achieve independent consensus on all the system's aspects and thus create its own cryptocurrency, including ATMs, cashiers, etc., all without writing any additional code.

Figure 3A:
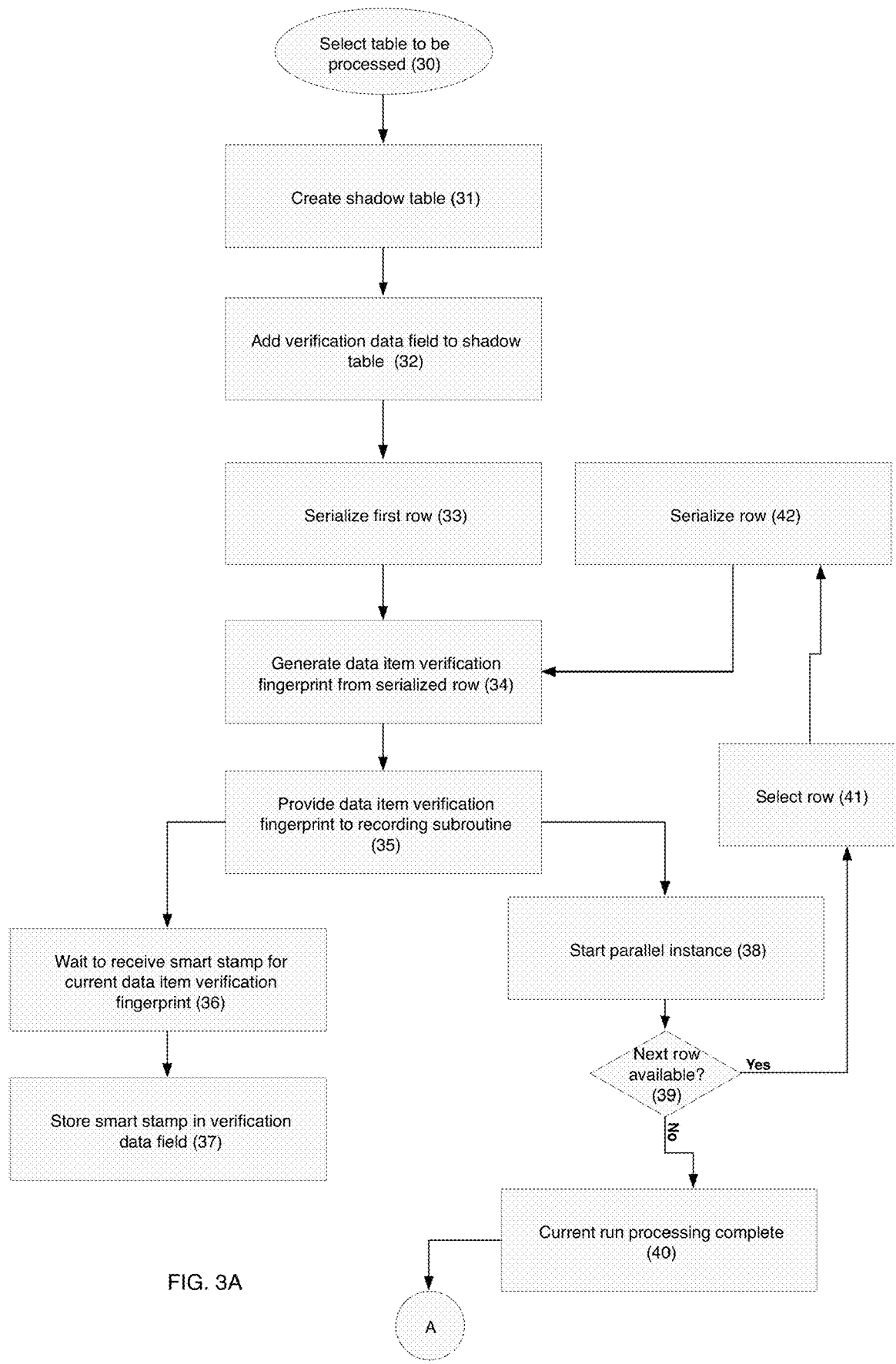
FIG. 3A shows a flow diagram of the operation of the database interface of FIG. 2.
Figure 3B:
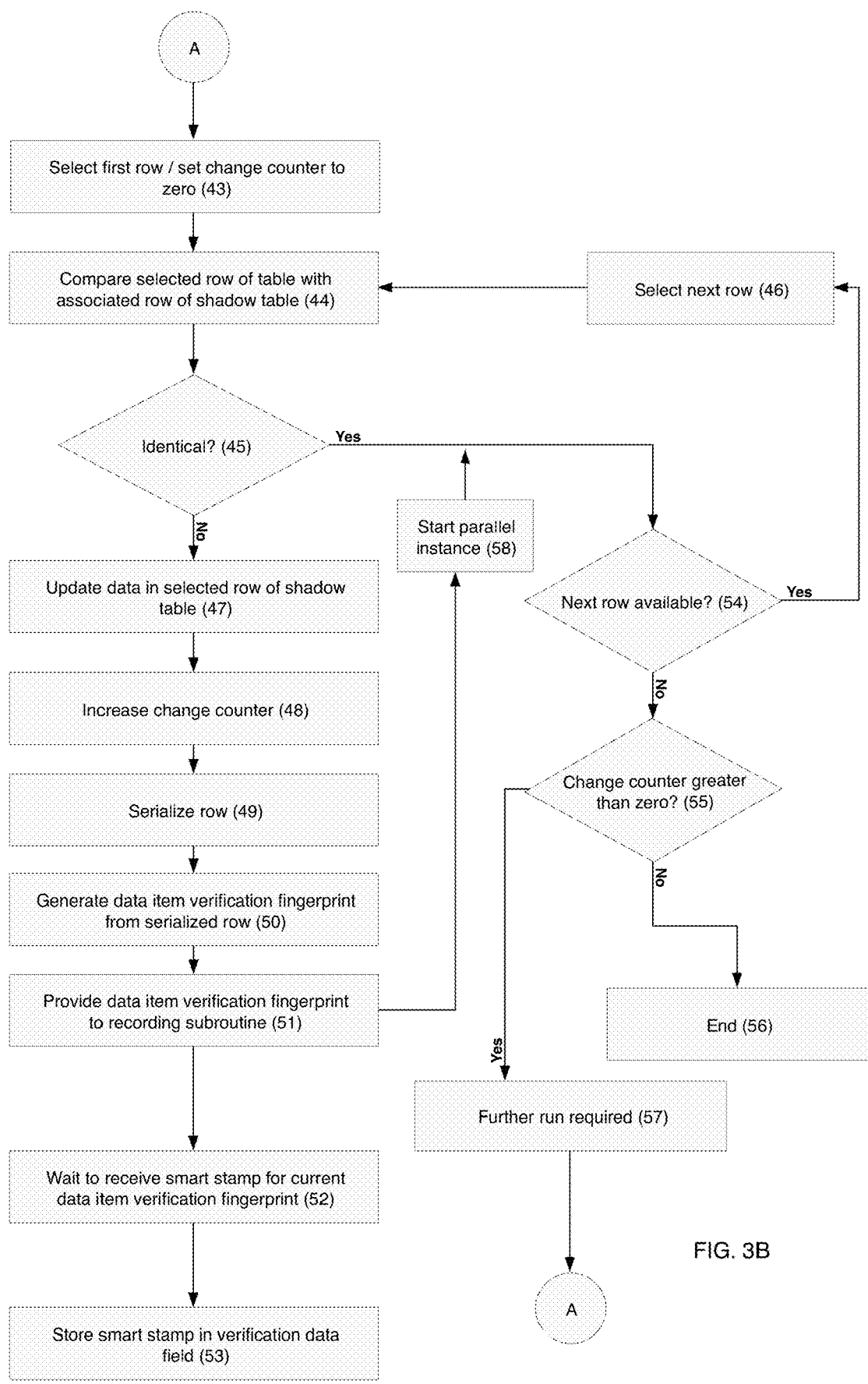
FIG. 3B shows another flow diagram of the operation of the database interface of FIG. 2.

The iterative process of FIG. 3B allows to update the shadow table after the initial run, discussed in the preceding with reference to FIG. 3A. The process of FIG. 3B may also be conducted periodically afterwards to synchronize the shadow table.

In step 43, a first row in the table to processed, i.e., in this example, table 2c of database system 1 is selected. In addition, a change counter, stored in the memory (not shown) of database interface 20 is set to zero. In step 44, the data of the selected row is compared with the data of the associated row in the shadow table using the respective primary key to find the associated row in the shadow table. If the rows in the two databases are not identical and in step 47, the data in the selected row in the shadow table is updated. It is noted that in case the selected row should not be present in the shadow table, a corresponding row is added to the shadow table in step 47.

Subsequently, the change counter is increased in step 48. The following processing of steps 49 through step 53 corresponds to the discussed processing of steps 33 through 37, namely in step 49, the data of the selected row of the shadow table is serialized, i.e., into a binary string. In step 50, a data item verification fingerprint, such as a hash, is generated from the serialized row. The generated associated data item verification fingerprint is provided to a recording subroutine in step 51. In step 52, the routine of database interface 20 waits to receive a smart stamp for the current data item verification fingerprint. Once the smart stamp is received in step 53, it is stored in the verification data field of the respective row of the shadow table.

In parallel to steps 52 and 53, a new (parallel) instance of the operation is started in step 58. The following operation in the new instance provides processing of a next row and is identical to the case that the selected row of the table 2c is identical to the associated row in the shadow table, i.e., in case no update of that row has taken place in the meantime, as can be seen from FIG. 3B.

In step 54, it is determined if a next row is available. If this is the case, the next row is selected in step 46 and the operation reverts to step 44, as discussed in the preceding, with the selected row. In case it is determined that no next row is available in step 54, the shadow table corresponds to the original table 2c. It is then determined if the change counter is greater than zero in step 55. A change counter value greater than zero indicates that during the last run, at least one row was changed. If this is the case and to obtain a highly congruent shadow table, it is then determined in step 57 that a further run is required. The operation then reverts to step 43.

If the determination in step 55 provides that no row in the shadow table needed to be updated, i.e., that the change counter remained at zero, the shadow table currently corresponds to the table 2c and the operation is terminated in step 56. As discussed in the preceding, the operation may be repeated in given intervals to update the shadow table and allow a verification of any updates. The operation that allows to verify a row/noun is discussed in WO 2018/026727 A1.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module, or other unit may fulfill the functions of several items recited in the claims.

The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method for interfacing a database system with a consensus system, comprising the steps of:
    creating a shadow table of a table of the database system; and
    for each row of the shadow table:
        serializing of data, stored in a row of the shadow table;
        generating a data item verification fingerprint of the data after the data has been serialized and stored in the current row of the shadow table; and
        providing the data item verification fingerprint to the consensus system.

2. The method of claim 1, wherein the consensus system stores the data item verification fingerprints in at least one blockchain.

3. The method of claim 1, wherein the consensus system stores the data item verification fingerprints using a consensus algorithm.

4. The method of claim 1, wherein the consensus system computes an aggregated verification fingerprint from a plurality of data item verification fingerprints and the aggregated verification fingerprint is stored.

5. The method of claim 1, further comprising adding a verification data field to the shadow table subsequent to creating the shadow table.

6. The method of claim 5, further comprising for each row of the shadow table, storing a smart stamp, received from the consensus system in the verification data field.

7. The method of claim 1, further comprising iteratively updating the shadow table, wherein each row of the table of the database system is compared with an associated row of the shadow table and wherein data of a differing row is copied from the table of the database system to the associated row of the shadow table.

8. The method of claim 7, further comprising for each differing row, generating a data item verification fingerprint of the data of the differing row; and providing the data item verification fingerprint to the consensus system.

9. The method of claim 1, further comprising adding a verification data field to the table of the database system.

10. The method of claim 9, further comprising for each row of the table of the database system, storing a smart stamp, received from the consensus system in the verification data field.

11. A non-transitory computer-readable medium including contents that are configured to cause a processing device to conduct the method of claim 1.

12. A system for interfacing a database system with a consensus system, comprising a database interface, which database interface is connected with a database system and a consensus system, the database interface implemented by a code execution system including a processor, the database interface being configured to create a shadow table of a table of the database system; and for each row of the shadow table:

serialize data, stored in a current row of the shadow table;

generate a data item verification fingerprint of the data after the data has been serialized and stored in the current row of the shadow table; and provide the data item verification fingerprint to the consensus system.

* * * * *